United States Patent
Bengtsson et al.

(10) Patent No.: US 7,023,532 B2
(45) Date of Patent: Apr. 4, 2006

(54) METHOD AND DEVICE FOR THE MEASURING OF THE OPTICAL POWER LOSS IN A FIBER OPTICAL CONTACT MEANS

(75) Inventors: Daniel Bengtsson, Kållered (SE); Sven-Olov Roos, Lerum (SE); Per-Arne Torstensson, Kungsbacka (SE)

(73) Assignee: Optoskand AB, Mölndal (SE)

( * ) Notice: Subject to any disclaimer, the term of this patent is extended or adjusted under 35 U.S.C. 154(b) by 452 days.

(21) Appl. No.: 10/149,701

(22) PCT Filed: Dec. 6, 2000

(86) PCT No.: PCT/SE00/02436

§ 371 (c)(1),
(2), (4) Date: Aug. 27, 2002

(87) PCT Pub. No.: WO01/44849

PCT Pub. Date: Jun. 21, 2001

(65) Prior Publication Data
US 2003/0086472 A1 May 8, 2003

(30) Foreign Application Priority Data
Dec. 15, 1999 (SE) .................................... 9904577

(51) Int. Cl.
*G01N 21/00* (2006.01)
(52) U.S. Cl. .................................... 356/73.1
(58) Field of Classification Search ............... 356/73.1; 385/134, 100; 250/227.1–227.28
See application file for complete search history.

(56) References Cited

U.S. PATENT DOCUMENTS

| 4,236,091 A | * | 11/1980 | Kutateladze et al. .......... 310/64 |
| 4,678,273 A | | 7/1987 | Vilhelmsson |
| 5,179,610 A | | 1/1993 | Milburn et al. |
| 5,508,491 A | * | 4/1996 | Sherman ................. 219/121.69 |
| 6,039,728 A | | 3/2000 | Berlien |
| 6,167,177 A | | 12/2000 | Sandström et al. |
| 6,459,478 B1 | * | 10/2002 | Schmidt et al. ............. 356/73.1 |

FOREIGN PATENT DOCUMENTS

| DE | 33 35 680 A1 | * | 9/1983 |
| DE | 4305313 | | 3/1994 |
| DE | 198 52 080 C1 | * | 11/1998 |
| EP | 0619508 | | 10/1994 |
| SU | 2031420 | | 2/1991 |
| WO | 93/19680 | | 10/1993 |
| WO | 98/01784 | | 1/1998 |

* cited by examiner

Primary Examiner—Tu T. Nguyen
(74) Attorney, Agent, or Firm—Venable LLP; Eric J. Franklin

(57) ABSTRACT

A method and apparatus for measuring the power loss in a fiber optical connector of the type which includes an optical fiber for transmitting high optical power, specifically power exceeding 1 kW. Incident radiation falling outside the fiber core is absorbed at least partially in a flowing coolant. The connector includes thermo-elements for measuring a temperature difference between the ingoing and outgoing coolant as a measure of the generated power loss. The flow speed may be adapted to different power losses.

11 Claims, 1 Drawing Sheet

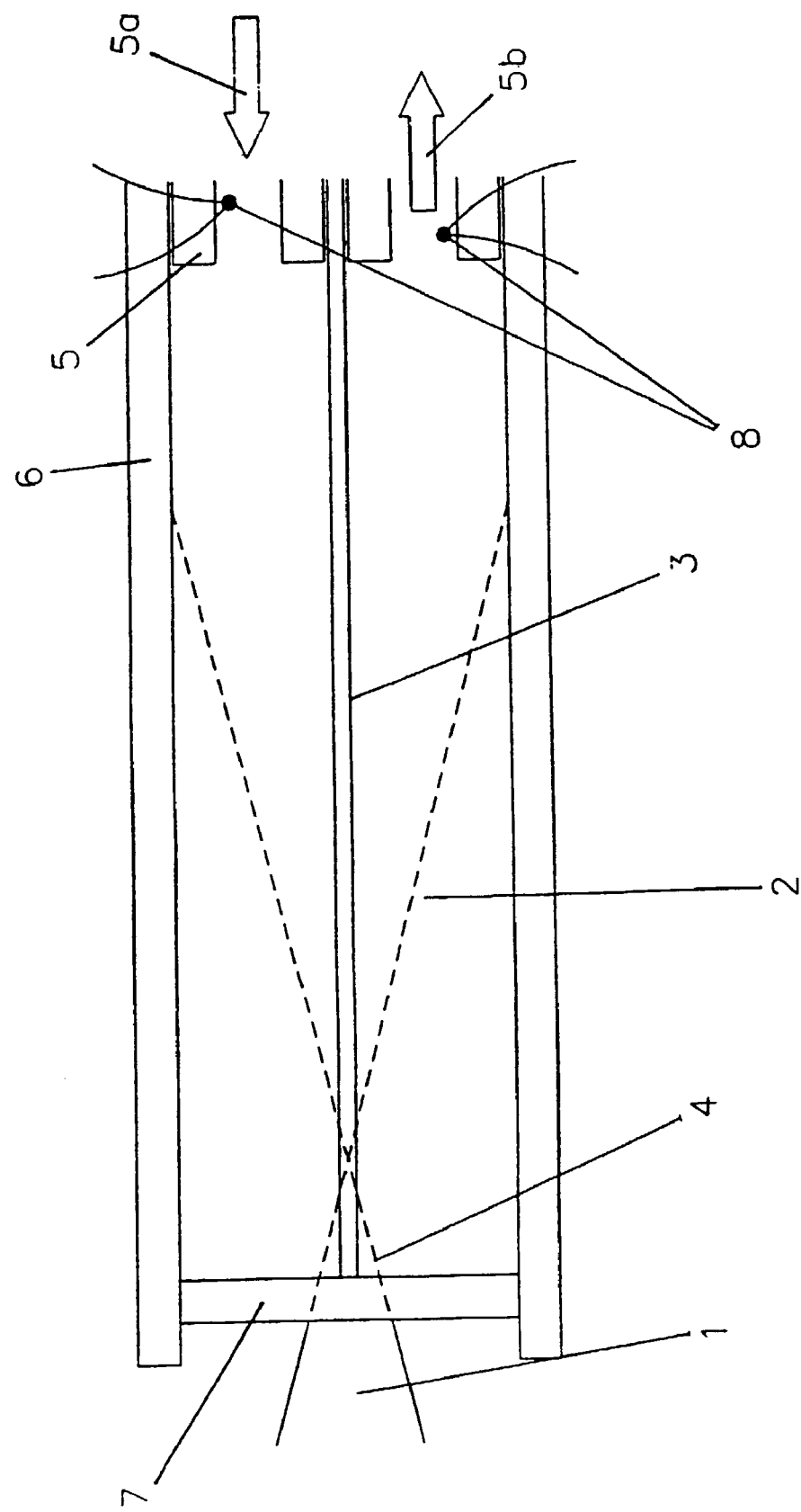

METHOD AND DEVICE FOR THE MEASURING OF THE OPTICAL POWER LOSS IN A FIBER OPTICAL CONTACT MEANS

FIELD OF THE INVENTION

The present invention relates to a method and means for measuring power loss in a fibre optical connector including an optical fibre for transmitting high optical power, specifically power exceeding 1 kW, and wherein incident optical radiation falling outside the fibre core is absorbed at least partially in a flowing coolant.

BACKGROUND OF THE INVENTION

Optical fibre cables for transmitting high optical power are frequently used in industrial applications. Specifically they are used in cutting and welding operations by means of high-power laser radiation, but also in other industrial applications such as heating, detection or working operations in high-temperature environments this type of optical fibre cables can be used. By means of the optical fibres it is possible to build up flexible manufacturing systems for transmitting radiation from the high power laser source to the workpiece. Normally, an optical fibre has a core of glass and a surrounding cladding. Laser sources which can be used in this context have average power from a few hundred watts up to several kilowatts.

When designing fibre systems for such high power laser radiation it is important to take care of radiation that falls outside the core of the fibre, due to for instance reflections against the workpiece or due to an incorrect focussing to the fibre, and cool it down in order to prevent uncontrolled heating in the system. Different methods to take care of such undesired power radiation are already known. One example is disclosed in DE 4305313, in which the radiation that falls into the cladding of the fibre is spread in a so-called mode stripper and absorbed by a metal surface. This surface can then be cooled from the outside of the device. A similar method is described in EP 0 151 909.

An optical fibre in which at least one of the end surfaces of the fibre core is provided with a rod having a larger diameter than the core diameter is described in EP 0 619 508. At this end the fibre is provided with a reflector designed to conduct rays entering outside the fibre towards an area where they can be absorbed without causing any damage. In the illustrated embodiment this area is surrounded by a heat-abducting device with cooling fins, but it is also mentioned that water cooling means may be included in this area for cooling off the generated heat. Also in this case the cooling is provided from the outside of the device. A similar arrangement in which the end part of the fiber is provided with a hollow rod and a reflector is described in GB 2 255 199.

In SE 509 706 and RU 2031420 it is described a method to take care of power loss in which the radiation heat completely or partially is absorbed directly in a flowing coolant instead of a metal. In SE 509 706 at least one of the contact ends of the fibre is located in a cavity filled with a flowing coolant so that radiation falling outside the fibre is entered into and absorbed at least partially by the coolant. According to a preferred embodiment the fibre is directly in contact with the surrounding coolant, for example water. The advantage by having the radiation absorbed directly in the coolant is a more effective cooling as no heat conducting through for instance a metal part is required before the heat is cooled off.

Even if the methods which have been described so far provides an effective cooling they do not indicate the level of the real power loss. Reflections on the workpiece always means that some part of the power returns to the fibre contact and generates a heating. In order to control the process it is of interest to measure the power loss in the fibre connector.

Under the development of lasers the diameter of the optical fibers has been decreased. A normal fibre diameter in the middle of the ninetees was around 0.5 mm, while recent lasers have fibre diameters down to approximately 0.1 mm. Then there are increasing demands on a correct focussing in the optical system. This has mostly been satisfied by means of active methods. It is then necessary to find out good methods for measuring the optimal position of the optical fibre.

SUMMARY OF THE INVENTION

The object of this invention is to provide a method and means for measuring the power loss in fiber connectors including a flowing coolant. Such means can then be used for process control or for an active positioning of the optical fibre.

According to the invention the temperature difference between the in- and outgoing coolant (liquid) is detected as a measure of the generated power loss.

According to a preferred embodiment termoelements are arranged in connection with the inlet- and outlet channels of the coolant.

BRIEF DESCRIPTION OF THE DRAWINGS

In the following the invention will be described more in detail with reference to the accompanying drawing which schematically illustrates an example of a fibre optical connector with a direct water cooling and detection of the power loss according to the invention.

FIG. 1 illustrates one end of a conventional optical fibre 3 having a core, for example of quartz glass, and a surrounding cladding, for example made of glass or some polymer having a suitable refractive index.

DETAILED DESCRIPTION OF EMBODIMENTS

A laser beam 1 is focused on the end surface of the fibre. Preferably a Nd-YAG laser source is used which has a wavelength of 1.06 μm. This wave-length is suitable for optical fibre transmission. Other examples of lasers that can be used are diode lasers, $CO_2$-lasers, CO-lasers and other types of Nd-lasers.

A liquid coolant 2 is surrounding the envelope surface of the end portion of the fibre. That part 4 of the incident laser radiation that falls outside the core of the fibre is entered into and absorbed, at least partially, by the coolant. Radiation (power) transmitted through the liquid is absorbed by the walls 5,6 enclosing the liquid. These walls are in direct contact with the coolant so that they are cooled directly on the surface. Some of the walls, in this case the rear wall 5, has an input pipe or channel 5a as well as an output pipe or channel 5b for the liquid coolant. The surface hit by the incident laser beam must be transparent so that the radiation can pass into the liquid cavity. This surface, the so called window 7, can either be glass-clear or diffuse, the important thing is that the absorption in this surface is low. The end surface of the fibre is in optical contact with the window 7. So far the optical connector corresponds to the one which is illustrated in said SE 509 706.

As there is an instantaneous heating of the liquid coolant the fibre connector can be used for measuring generated power loss. According to the invention the temperature difference between in- and outgoing liquid coolant is measured, which is also a measure of the generated power loss. Suitable detectors for such temperature measurement are termoelements as they provide just such a temperature difference signal. However, other types of detectors could be used. In the figure it is illustrated how such termoelements or detectors 8 could be arranged in the inlet and outlet opening 5a, 5b, respectively, for the liquid coolant.

According to a preferred embodiment the flow speed could be regulated in accordance with the level of the power loss. Regulators for controlling the flow speed of a liquid coolant are known per se and will not be described here.

The temperature difference in a liquid coolant is determined by $$\Delta T = p \cdot 60000/(c \cdot \rho \cdot F)$$

where
P is the power loss in W,
c is the heat capacity in J/(kg·K),
$\rho$ is the density in kg/m$^3$, and
F is the flow speed in l/min.
For water $$c=4180 \text{ J(kg·K) and } \rho=998 \text{ kg/m}^3$$

This means that $$\Delta T=0.014 \cdot P/F$$

By adapting the flow speed to the power loss in question the system can be optimized. In cases of back reflection, where the power loss could be up to 1 kW, flow speeds of about 1 l/min should be satisfactory. Then high power losses could be detected at the same time as power loss variations of a few tens of watt. In case of optimizing a fibre position the power losses are much lower, but then a more precise measurement is also required. By reducing the flow speed for instance by a factor 10 a required accuracy can be reached.

The rapidity of a response is limited by the volume into which the radiation is absorbed and by the value of the flow speed. Typical values for the absorption volume could be 10 cm$^3$ and for the flow speed 1 l/min. This means a response time of approximately 0.5 sek.

The invention is not limited to the fibre connector which has been illustrated here as an example, but can be varied within the scope of the accompanying claims. Consequently, it should be understood that the invention could be used also on other types of fiber contacts in which a liquid coolant takes care of the power loss.

The invention claimed is:

1. A method for measuring power loss in a fiber optical connector including an optical fiber for transmitting high optical power exceeding 1 kW, the method comprising:

at least partially absorbing in a flowing coolant incident radiation falling outside the fiber core; and detecting a temperature difference between ingoing coolant and outgoing coolant heated by the incident radiation, thereby providing a measurement of a generated power loss due to incident radiation absorbed by the coolant.

2. The method according to claim 1, wherein the temperature difference is measured by means of thermo-elements arranged in connection with inlet and outlet channels for the coolant.

3. The method according to claim 1, wherein the flow speed of the coolant is adapted to the power loss to be detected.

4. The method according to claim 3, wherein the flow speed of the coolant is adjusted to a higher flow speed when power loss in connection with back reflections is detected as compared to when power loss in connection with back reflections is not detected.

5. The method according to claim 3, wherein the flow speed of the coolant is adjusted to optimize a fiber position.

6. An apparatus for measuring power loss in a fiber optical connector including an optical fiber for transmitting high optical power exceeding 1 kW, and wherein incident radiation falling outside the fiber core is absorbed at least partially in a flowing coolant, wherein the connector comprises a detector for detecting a temperature difference between ingoing coolant and outgoing coolant heated by the incident radiation, thereby providing a measurement of a generated power loss due to incident radiation absorbed by the coolant.

7. The apparatus according to claim 6, wherein the detector comprises thermo-elements arranged in connection with inlet and outlet openings for the coolant for measuring the temperature difference.

8. The apparatus according to claim 6, wherein the flow speed of the coolant is adjustable to allow an adaption of the flow speed to the power losses to be detected.

9. The apparatus according to claim 8, wherein the flow speed of the coolant is adjusted to a higher flow speed when detecting power losses in connection with back reflections as compared to when power losses in connection with back reflections are not detected.

10. The apparatus according to claim 8, wherein the flow speed of the coolant is adjusted to optimize a fiber position.

11. A fiber optic contact, comprising:
an optical fiber for transmitting high optical power exceeding 1 kW;
a connector;
a coolant flowing in the connector and operative to at least partially absorb incident radiation falling outside a core of the fiber; and
a detector operative to detect a temperature difference between ingoing coolant and outgoing coolant heated by the incident radiation, thereby providing a measurement of a generated power loss due to incident radiation absorbed by the coolant.

* * * * *